US008827788B2

(12) United States Patent
Takagi et al.

(10) Patent No.: US 8,827,788 B2
(45) Date of Patent: Sep. 9, 2014

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventors: Yuzo Takagi, Tokyo (JP); Taro Kanno, Tokyo (JP); Takahiko Wada, Tokyo (JP); Jumpei Ueno, Tokyo (JP); Ryosuke Onuma, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/959,510

(22) Filed: Aug. 5, 2013

(65) Prior Publication Data

US 2014/0066199 A1 Mar. 6, 2014

(30) Foreign Application Priority Data

Aug. 29, 2012 (JP) ................................. 2012-189225

(51) Int. Cl.
| | |
|---|---|
| A63F 13/00 | (2014.01) |
| A63F 13/10 | (2006.01) |
| A63F 13/12 | (2006.01) |
| A63F 13/30 | (2014.01) |

(52) U.S. Cl.
CPC ...................................... A63F 13/12 (2013.01)
USPC ........................ 463/9; 463/1; 463/14; 463/42

(58) Field of Classification Search
USPC .............................................. 463/1, 9, 14, 42
See application file for complete search history.

(56) References Cited

U.S. PATENT DOCUMENTS

| | | | | |
|---|---|---|---|---|
| 5,662,332 A | * | 9/1997 | Garfield | 273/308 |
| 6,354,939 B1 | * | 3/2002 | Morita et al. | 463/1 |
| 6,375,566 B1 | * | 4/2002 | Yamada | 463/1 |
| 6,398,651 B1 | * | 6/2002 | Yamada | 463/43 |
| RE37,957 E | * | 1/2003 | Garfield | 273/308 |
| 6,533,663 B1 | * | 3/2003 | Iwao et al. | 463/32 |
| 7,371,165 B2 | * | 5/2008 | Reizei et al. | 463/11 |

(Continued)

FOREIGN PATENT DOCUMENTS

| | | |
|---|---|---|
| JP | 2003-117241 | 4/2003 |
| JP | 2007-075465 | 3/2007 |
| JP | 2008-161536 | 7/2008 |
| JP | 2010-075433 | 4/2010 |

OTHER PUBLICATIONS

Japanese Patent Application No. 2012-189225: Office Action mailed on Dec. 11, 2012.

*Primary Examiner* — William H McCulloch, Jr.
(74) *Attorney, Agent, or Firm* — Procopio, Cory, Hargreaves & Savitch LLP

(57) ABSTRACT

A server device according to the present invention is connected with a player terminal that displays a game screen through a network, and to execute a battle game played by a player using a plurality of characters. The server device includes: a storage unit configured to store the plurality of characters to be arranged in the character arrangement area; a special area selection unit configured to select a special area to be highlighted on a game screen; a character arrangement unit configured to arrange a character selected from the plurality of characters to be arranged in the character arrangement area in the highlighted special area; and a battle processing unit configured to control attack processing in which the character arranged in the special area performs an attack and attack processing in which a character arranged in an area other than the special area performs an attack to be different.

8 Claims, 17 Drawing Sheets

(56) References Cited

U.S. PATENT DOCUMENTS

| | | | |
|---|---|---|---|
| 8,585,508 B1* | 11/2013 | Takagi et al. | 463/42 |
| 8,591,303 B2* | 11/2013 | Ikeda | 463/1 |
| 8,678,933 B2* | 3/2014 | Kobayashi | 463/42 |
| 8,715,091 B1* | 5/2014 | Hashimoto et al. | 463/42 |
| 2005/0021159 A1* | 1/2005 | Ogawa | 700/91 |
| 2007/0066400 A1* | 3/2007 | Kogo | 463/42 |
| 2008/0200250 A1* | 8/2008 | Orihara et al. | 463/31 |
| 2009/0051114 A1* | 2/2009 | Robbers et al. | 273/293 |
| 2009/0054124 A1* | 2/2009 | Robbers et al. | 463/9 |
| 2011/0275442 A1* | 11/2011 | Hawkins, III | 463/42 |
| 2012/0190443 A1* | 7/2012 | Fujisawa et al. | 463/31 |
| 2013/0137522 A1* | 5/2013 | Kusano et al. | 463/42 |
| 2013/0184040 A1* | 7/2013 | Nonaka et al. | 463/7 |
| 2013/0225259 A1* | 8/2013 | Kojo | 463/22 |
| 2013/0260881 A1* | 10/2013 | Nonaka et al. | 463/29 |
| 2013/0288762 A1* | 10/2013 | Yoshie | 463/8 |
| 2013/0316835 A1* | 11/2013 | Takagi et al. | 463/42 |
| 2014/0066199 A1* | 3/2014 | Takagi et al. | 463/31 |
| 2014/0080595 A1* | 3/2014 | Suga et al. | 463/31 |
| 2014/0113730 A1* | 4/2014 | Takagi et al. | 463/43 |
| 2014/0151960 A1* | 6/2014 | Caffrey | 273/237 |

* cited by examiner

FIG. 4

| CARD ID | CHARACTER NAME | CHARACTER IMAGE | RARITY | INITIAL ATTACK POWER | INITIAL DEFENSE POWER | INITIAL PHYSICAL POWER |
|---|---|---|---|---|---|---|
| 0001 | CHARACTER A | | COMMON | 15 | 8 | 10 |
| 0002 | CHARACTER B | | UNCOMMON | 30 | 20 | 15 |
| 0003 | CHARACTER C | | RARE | 45 | 30 | 25 |
| 0004 | CHARACTER D | | SUPER RARE | 60 | 55 | 60 |
| ... | ... | ... | ... | ... | ... | ... |

FIG. 5

| PLAYER ID | FRIEND PLAYER ID | POSSESSED CARD INFORMATION | DECK INFORMATION |
|---|---|---|---|
| 1 | 5, 8 | POSSESSED CARD INFORMATION (1) | DECK INFORMATION (1) |
| 2 | NONE | POSSESSED CARD INFORMATION (2) | DECK INFORMATION (2) |
| 3 | 4, 6 | POSSESSED CARD INFORMATION (3) | DECK INFORMATION (3) |
| 4 | 3, 6 | POSSESSED CARD INFORMATION (4) | DECK INFORMATION (4) |
| 5 | 1, 6 | POSSESSED CARD INFORMATION (5) | DECK INFORMATION (5) |
| 6 | 3, 4, 5 | POSSESSED CARD INFORMATION (6) | DECK INFORMATION (6) |
| . | . | . | . |
| . | . | . | . |
| . | . | . | . |

FIG. 7

| DECK INFORMATION (1) ||
|---|---|
| AREA ID | CARD ID |
| 1 | 0051 |
| 2 | 1240 |
| 3 | 0756 |
| 4 | 1089 |
| 5 | 0133 |
| 6 | 0007 |
| 7 | 0936 |
| 8 | 0211 |
| 9 | 0011 |

DECK INFORMATION (2)

DECK INFORMATION (3)

FIG. 8

| AREA ID | UNIT AREA NAME | ATTACK POWER MULTIPLYING FACTOR | DEFENSE POWER MULTIPLYING FACTOR |
|---|---|---|---|
| 1 | FRONT SQUARE (LEFT) | 1.5 TIMES | 0.75 TIMES |
| 2 | FRONT SQUARE (CENTER) | | |
| 3 | FRONT SQUARE (RIGHT) | | |
| 4 | CENTRAL SQUARE (LEFT) | 1.0 TIMES | 1.0 TIMES |
| 5 | CENTRAL SQUARE (CENTER) | | |
| 6 | CENTRAL SQUARE (RIGHT) | | |
| 7 | REAR SQUARE (LEFT) | 0.75 TIMES | 1.5 TIMES |
| 8 | REAR SQUARE (CENTER) | | |
| 9 | REAR SQUARE (RIGHT) | | |

SERVER DEVICE, AND NON-TRANSITORY COMPUTER-READABLE STORAGE MEDIUM STORING GAME PROGRAM

CROSS-REFERENCE TO RELATED APPLICATION(S)

This application claims the benefit of Japanese Patent Application No. 2012-189225, filed Aug. 29, 2012, the disclosure of which is hereby incorporated by reference in its entirety.

BACKGROUND OF THE INVENTION

1. Field of the Invention

The present invention relates to a server device, and a non-transitory computer-readable storage medium storing game program.

2. Description of the Related Art

A game device that executes a battle game played by a player using a plurality of characters arranged in a character arrangement area including a plurality of unit areas has been known (for example, Japanese Patent Application Laid-Open No. 2008-161536).

SUMMARY OF THE INVENTION

In such a battle game, a character arranged in a front unit area has higher attack power and a character arranged in a rear unit area has higher defense power in the character arrangement area. If the unit areas that influence the attack power and the like of the characters are determined in advance in this manner, character arrangement by the player becomes uniform and the player gets bored with similar character arrangements.

The present invention has been made in view of such problems, and an object is to suppress uniformity of character arrangement.

A principal embodiment of the present invention to solve the above-described problems is a server device configured to be connected with a player terminal configured to display a game screen including a character arrangement area including a plurality of unit areas through a network, and to execute a battle game played by a player using a plurality of characters arranged corresponding to the unit areas in the character arrangement area, the server device including:

a storage unit configured to store a player character group including the plurality of characters to be arranged in the character arrangement area;

a special area selection unit configured to select a special area to be highlighted on a game screen displayed in the player terminal during a battle from among the plurality of unit areas;

a character arrangement unit configured to arrange a character selected from the plurality of characters configuring the player character group in the highlighted special area according to an operation by the player; and a battle processing unit configured to control attack processing in which the character arranged in the special area performs an attack to be different from attack processing in which a character arranged in an area other than the special area performs an attack, wherein the battle processing unit calculates a difference value between a parameter value set to the player character group and a parameter value set to an enemy character value that is to be an opponent, and determines whether the calculated difference value is a predetermined value or more, and the special area selection unit selects the special area from among the plurality of unit areas when it is determined by the battle processing unit that the difference value is the predetermined value or more.

Other features of the present invention will become apparent from the description of the present specification and the appended drawings.

According to an embodiment of the present invention, uniformity of character arrangement can be suppressed.

BRIEF DESCRIPTION OF THE DRAWINGS

FIG. 4 is a table illustrating an exemplary data structure of card information;

FIG. 5 is a table illustrating an exemplary data structure of player information;

FIG. 7 is a diagram illustrating an exemplary data structure of deck information;

FIG. 8 is a table illustrating an exemplary data structure of character arrangement area information;

DETAILED DESCRIPTION OF THE INVENTION

Figure 1:
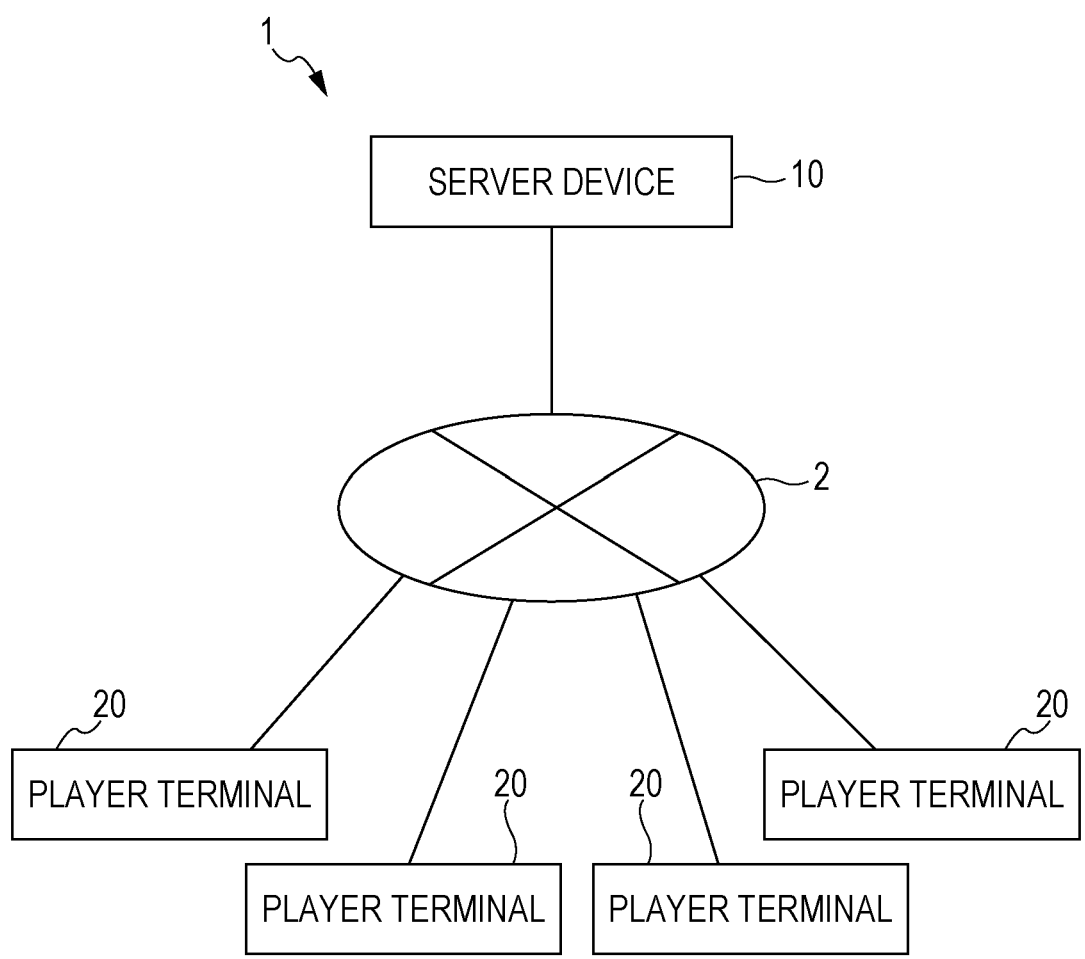
FIG. 1 is a diagram illustrating an exemplary overall configuration of a game system.

At least the following matters will become apparent according to the description of the present specification and the appended drawings.

That is, a server device is configured to be connected with a player terminal configured to display a game screen including a character arrangement area including a plurality of unit areas through a network, and to execute a battle game played by a player using a plurality of characters arranged corresponding to the unit areas in the character arrangement. The server device includes:

a storage unit configured to store the plurality of characters to be arranged in the character arrangement area;

a special area selection unit configured to select a special area to be highlighted on a game screen displayed in the player terminal during a battle from among the plurality of unit areas;

a character arrangement unit configured to arrange a character selected from the plurality of characters to be arranged in the character arrangement area in the highlighted special area according to an operation by the player; and a battle processing unit configured to control attack processing in which the character arranged in the special area performs an attack to be different from attack processing in which a character arranged in an area other than the special area performs an attack.

According to such a server device, the uniformity of the character arrangement can be suppressed.

Further, a server device is configured to be connected with a player terminal configured to display a game screen including a character arrangement area including a plurality of unit areas through a network, and to execute a battle game played by a player using a plurality of characters arranged corresponding to the unit areas in the character arrangement. The server device includes:

a storage unit configured to store the plurality of characters to be arranged in the character arrangement area;

a special area selection unit configured to select a special area to be highlighted on a game screen displayed in the player terminal during a battle from among the plurality of unit areas;

a character arrangement unit configured to arrange a character automatically selected from the plurality of characters to be arranged in the character arrangement area without an operation of the player in the highlighted special area; and a battle processing unit configured to control attack processing in which the character arranged in the special area performs an attack to be different from attack processing in which a character arranged in an area other than the special area performs an attack.

According to such a server device, the uniformity of the character arrangement can be suppressed.

Further, in the server device, the character arrangement unit may cause a unit area to be in a vacant state in which a character is not arranged by not arranging a character satisfying a predetermined condition in the unit area during the battle.

According to such a server device, by causing the unit area to be a vacant state, the player can arrange a character again, whereby the uniformity of the character arrangement can be further suppressed.

Further, in the server device, the storage unit may store at least one character possessed by the player and at least one character possessed by another player, respectively; and the character arrangement unit may select a character possessed by the another player by referring to the storage unit, and arranges the selected character in the unit area in the vacant state.

According to such a server device, a character possessed by the another player can be arranged in the unit area in a vacant state. Therefore, communication with the another player becomes possible.

Further, a non-transitory computer-readable storage medium storing a game program causes a server device configured to be connected with a player terminal configured to display a game screen including a character arrangement area including a plurality of unit areas through a network to execute a battle game played by a player using a plurality of characters arranged corresponding to the unit areas in the character arrangement area. The game program causes the server device to execute:

processing of storing the plurality of characters to be arranged in the character arrangement area in a storage unit;

processing of selecting a special area to be highlighted on a game screen displayed in the player terminal during a battle from among the plurality of unit areas;

processing of arranging a character selected from the plurality of characters to be arranged in the character arrangement area in the highlighted special area according to an operation of the player; and processing of battle for controlling attack processing in which the character arranged in the special area performs an attack to be different from attack processing in which a character arranged in an area other than the special area performs an attack.

According to such a game program, the uniformity of the character arrangement can be suppressed.

Further, a non-transitory computer-readable storage medium storing a game program causes a server device configured to be connected with a player terminal configured to display a game screen including a character arrangement area including a plurality of unit areas through a network to execute a battle game played by a player using a plurality of characters arranged corresponding to the unit areas in the character arrangement area. The game program causes the server device to execute:

processing of storing the plurality of characters to be arranged in the character arrangement area in a storage unit;

processing of selecting a special area to be highlighted on a game screen displayed in the player terminal during a battle from among the plurality of unit areas;

processing of arranging a character automatically selected from the plurality of characters to be arranged in the character arrangement area without an operation of the player in the highlighted special area; and processing of battle for controlling attack processing in which the character arranged in the special area performs an attack to be different from attack processing in which a character arranged in an area other than the special area performs an attack.

According to such a game program, the uniformity of the character arrangement can be suppressed.

Embodiments

<<Configuration of Game System 1>>

FIG. 1 is a diagram illustrating an exemplary overall configuration of a game system 1 according to the present embodiment. The game system 1 provides a player with various services related to games through a network 2 (for example, the Internet), and includes a server device 10 and a plurality of player terminals 20.

<<Configuration of Server Device 10>>

Figure 2:
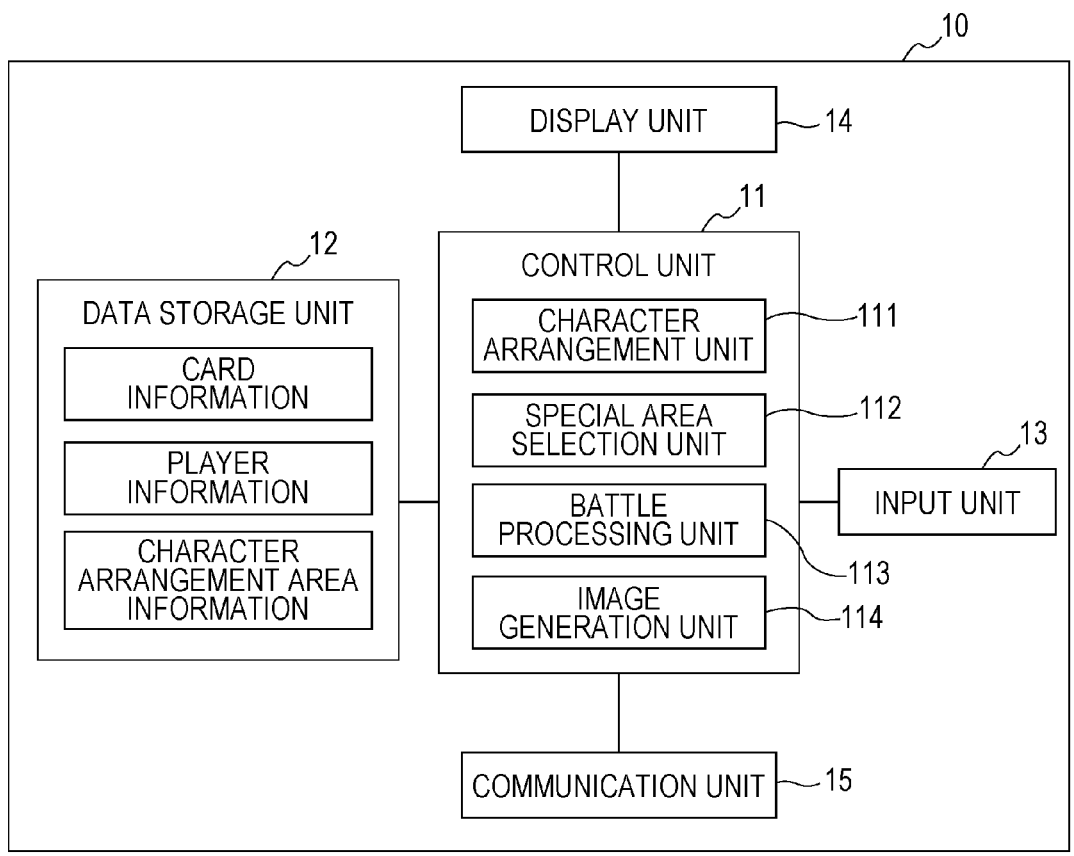
FIG. 2 is a block diagram illustrating a functional configuration of a server device.

FIG. 2 is a block diagram illustrating a functional configuration of the server device 10 according to the present embodiment. The server device 10 is an information processing apparatus (for example, a workstation or a personal computer) used when a system administrator and the like manage the game service. Upon receiving various commands (requests) from the player terminal 20, the server device 10 can distribute a game program operable on the player terminal 20, and a web page and the like made in a markup language (HTML, and the like) according to a specification of the player terminal 20. The server device 10 includes a control unit 11, a data storage unit 12, an input unit 13, a display unit 14, and a communication unit 15.

The control unit 11 performs data passing among units as well as controlling the entire server device 10, and is realized by a central processing unit (CPU) executing a program stored in a predetermined memory. The control unit 11 of the present embodiment includes a character arrangement unit 111, a special area selection unit 112, a battle processing unit 113, and an image generation unit 114.

The character arrangement unit 111 has a function to execute processing of arranging a plurality of characters in a character arrangement area including a plurality of unit areas.

The special area selection unit 112 has a function to execute processing of selecting a special area highlighted and displayed during a battle on a game screen displayed in the player terminal 20 from among the plurality of unit areas configuring the character arrangement area.

The battle processing unit 113 has a function to execute various types of processing related to the battle, such as processing of determining an outcome of the battle between a player character and an enemy character.

The image generation unit 114 has a function to execute processing of generating various types of image data such as a game image and an operation image for allowing the player to play a game.

The data storage unit 12 includes a read only memory (ROM) that is a read only storage area in which a system program is stored, and a random access memory (RAM) that is a rewritable storage area used as a work area for arithmetic processing by the control unit 11. The data storage unit 12 is realized by, for example, a non-volatile storage device, such as a flash memory and a hard disk. The data storage unit 12 of the present embodiment stores card information, player information, and character arrangement area information. The card information relates to game cards as an example of game content. The player information relates to a player. The character arrangement area information relates to the character arrangement area. Note that each of the information will be described below in detail.

The input unit 13 is used for inputting various data (for example, the card information) by the system administrator, and the like, and is realized by, for example, a keyboard and a mouse.

The display unit 14 is used for displaying an operation screen for the system administrator based on a command from the control unit 11, and is realized by, for example, a liquid crystal display (LCD).

The communication unit 15 is used for performing communication with the player terminal 20. The communication unit 15 has a function as a reception unit that receives various data and signals transmitted from the player terminal 20, and a function as a transmission unit that transmits various data and signals to the player terminal 20 according to a command of the control unit 11. The communication unit 15 is realized by, for example, a network interface card (NIC).

<<Configuration of Player Terminal 20>>

Figure 3:
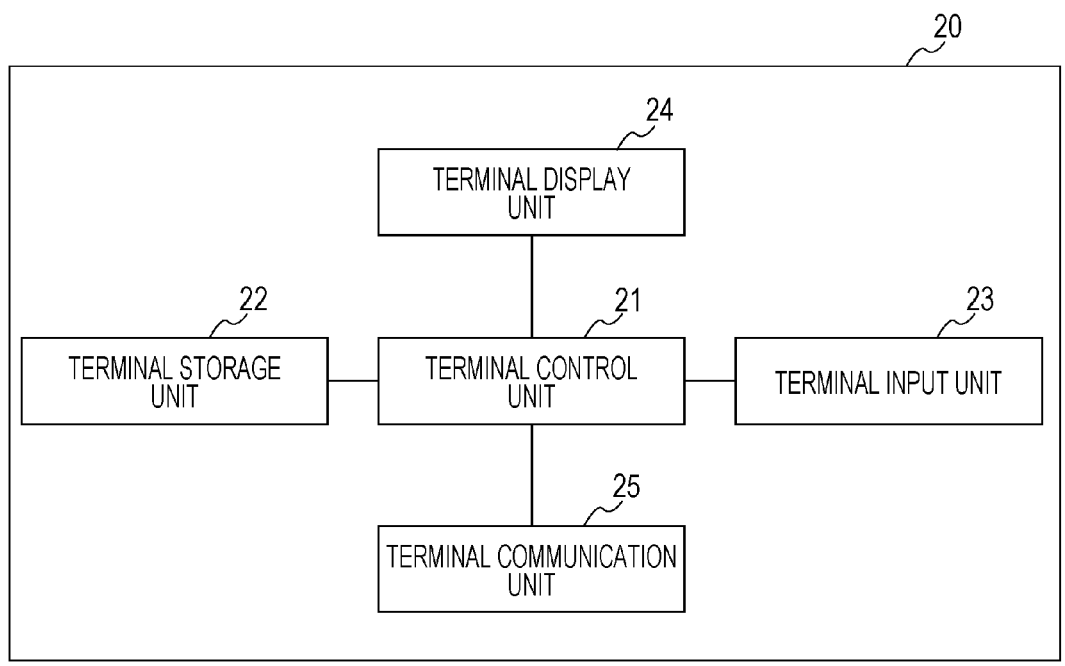
FIG. 3 is a block diagram illustrating a functional configuration of a player terminal.

FIG. 3 is a block diagram illustrating a functional configuration of the player terminal 20. The player terminal 20 of the present embodiment is an information processing apparatus (for example, a mobile phone terminal or a smart phone) used by the player when a game is played. The player terminal 20 can request to the server device 10 to distribute various types of information (a game program, a web page, and the like) related to the game. Since the player terminal 20 has a web browser function for allowing the player to browse a web page, the web page (a game play image, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls the display state of the game screen displayed on the terminal display unit 24.

The terminal storage unit 22 is connected to the terminal control unit 21 through a bus, and performs processing of referring to, reading, rewriting stored data according to a command from the terminal control unit 21. The terminal storage unit 22 is realized by, for example, a flash memory and a hard disk.

The terminal input unit 23 is used by the player for performing various operations (a game operation, and the like), and is realized by, for example, an operation button and a touch panel.

The terminal display unit 24 is used for displaying a game screen (a game image, an operation image, and the like) according to a command from the terminal control unit 21, and is realized by, for example, a liquid crystal display (LCD).

The terminal communication unit 25 functions as a transmission/reception unit for transmitting/receiving various types of information to/from the server device 10 through the network 2, and is realized by, for example, a network interface card (NIC).

<<Data Structure>>

FIG. 4 is a table illustrating an exemplary data structure of the card information stored in the data storage unit 12 of the server device 10. The card information includes items (fields), such as a card ID, a character name, a character image, rarity, initial attack power, initial defense power, and initial physical power. The card ID is identification information for identifying a game card as an example of the game content. The character name is information indicating a display name of a character associated with a game card. The character image is image data of a character. The rarity is a parameter indicating the degree of rarity of a game card. In the present embodiment, four levels of rarity ("common"→"uncommon"→"rare"→"super rare") are set to game cards (characters). The initial attack power, initial defense power, initial physical power, and the like of a character are parameters indicating ability values initially set to the character.

FIG. 5 is a table illustrating an exemplary data structure of the player information stored in the data storage unit 12 of the server device 10. The player information includes items, such as a player ID, a friend player ID, possessed card information, and deck information. The player ID is identification information for identifying the player. The friend player ID is information indicating other players registered in a friend list of the player. The possessed card information is information indicating a game card possessed by the player (hereinafter, also referred to as a possessed card). The deck information is information related to a deck constructed by the player (a character group arranged in the character arrangement area).

Figure 6:
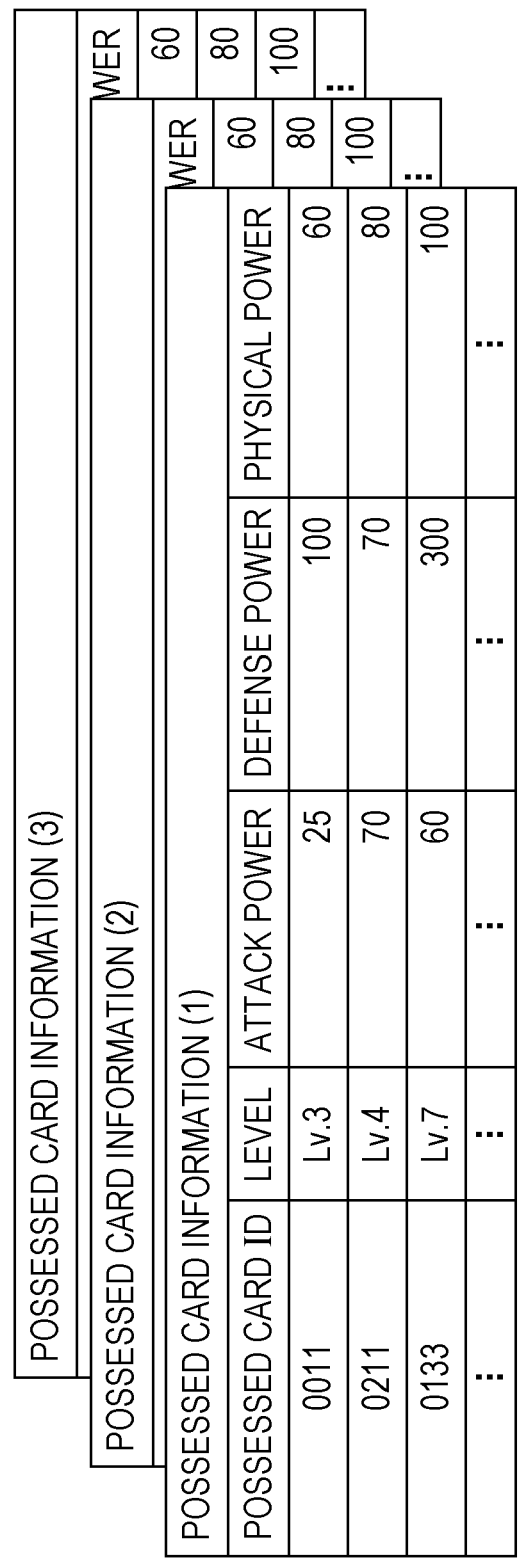
FIG. 6 is a diagram illustrating an exemplary data structure of possessed card information.

FIG. 6 is a diagram illustrating an exemplary data structure of the possessed card information. The possessed card information includes items, such as a possessed card ID, a level of the possessed card, attack power, defense power, and physical power. The possessed card ID is identification information for identifying a possessed card. The level of the possessed card, the attack power, the defense power, the physical power, and the like are parameters indicating ability values set to a character corresponding to a possessed card. These various parameters are updated according to a result of a battle game, and the like.

FIG. 7 is a diagram illustrating an exemplary data structure of the deck information. The deck information includes items of an area ID and a card ID. The area ID is identification information for identifying a unit area in which a character that configures a deck is arranged. The card ID is identification information for identifying a character (game card) arranged in a unit area of an associated area ID.

FIG. 8 is a table illustrating an exemplary data structure of the character arrangement area information stored in the data storage unit 12 of the server device 10. The character arrangement area information includes items of an area ID, a unit area name, an attack power multiplying factor, and a defense power multiplying factor. The area ID is identification information for identifying a unit area in which a character that configures a deck is arranged. The unit area name is information indicating a display name of a unit area that configures the character arrangement area. The character arrangement area of the present embodiment is divided into a front squares (left, center, and right) in which front guard characters are arranged, middle squares (left, center, and right) in which middle guard characters are arranged, and rear squares (left, center, and right) in which rear guard characters are arranged. The attack power multiplying factor is information indicating how many attack parameter values before area arrangement is equivalent to an attack parameter value after area arrangement. The defense power multiplying factor is information indicating how many defense parameter values before area arrangement is equivalent to a defense parameter value after area arrangement.

<<Outline of Game>>

Here, an outline of a game provided by the game system 1 of the present embodiment will be described. In the game system 1, a battle game performed using a game card (a virtual card used in a virtual space in the game) is provided.

<Construction of Deck (Arrangement of Characters)>

In the game system 1 of the present embodiment, the player can possess a plurality of game cards associated with game characters. Before start of a battle game, the player can construct a deck (player character group) by combining game cards (characters) selected from the plurality of possessed game cards. The deck construction in the present embodiment is performed such that the player arranges characters corresponding to squares in the character arrangement area that is divided into a total of nine (3×3) squares (unit areas). Note that the deck construction can be performed by automatically arranging the plurality of characters on the squares without an operation by the player (recommended construction).

<Battle Game>

In the game system 1 of the present embodiment, a battle between a deck constructed by the player (player character group) and a deck of an opponent (enemy character group) is performed. To be specific, the control unit 11 of the server device 10 determines an outcome of the battle game by these character groups based on various parameters parameter (the attack power, the defense power, and the physical power) and the like set to the characters that configure the player character group and the enemy character group, respectively. At this time, the control unit 11 makes the battle game to progress in a turn system, in which an attack phase of the player character group and an attack phase of the enemy character group constitute one turn.

Further, in the game system 1 of the present embodiment, the player can change the arrangement of the characters that configure the deck in accordance with a game progress during the battle. For example, a character arranged in a rear square within the character arrangement area can be replaced with a character arranged in a front square. In addition, a character can be arranged in a square in a vacant state, where no character is arranged. In addition, when a special area appears within the character arrangement area, a character can be arranged in the special area.

<Appearance of Special Area>

In the game system 1 of the present embodiment, a "special chance" that causes a special area to appear in the character arrangement area is generated in the progress of the battle game. In the present embodiment, when the special chance is generated, any one of the nine squares that configure the character arrangement area is highlighted as the special area. When a character selected by the player is arranged in the special area, the character in the special area can exert a special effect. In the present embodiment, an attack by the character arranged in the special area is differentiated from an attack by the character arranged in areas other than the special area. Since an area that influences the attack power and the like of the character is not fixed in advance, the uniformity of the character arrangement by the player can be suppressed.

<<Exemplary Operation of Game System 1>>

Next, an example of an operation performed by the game system 1 according to the present embodiment will be specifically described. Hereinafter, a deck construction operation in which a deck including a plurality of player characters is constructed will be described first, and a battle operation using the constructed deck will be described.

<Deck Construction Operation>

Figure 9:
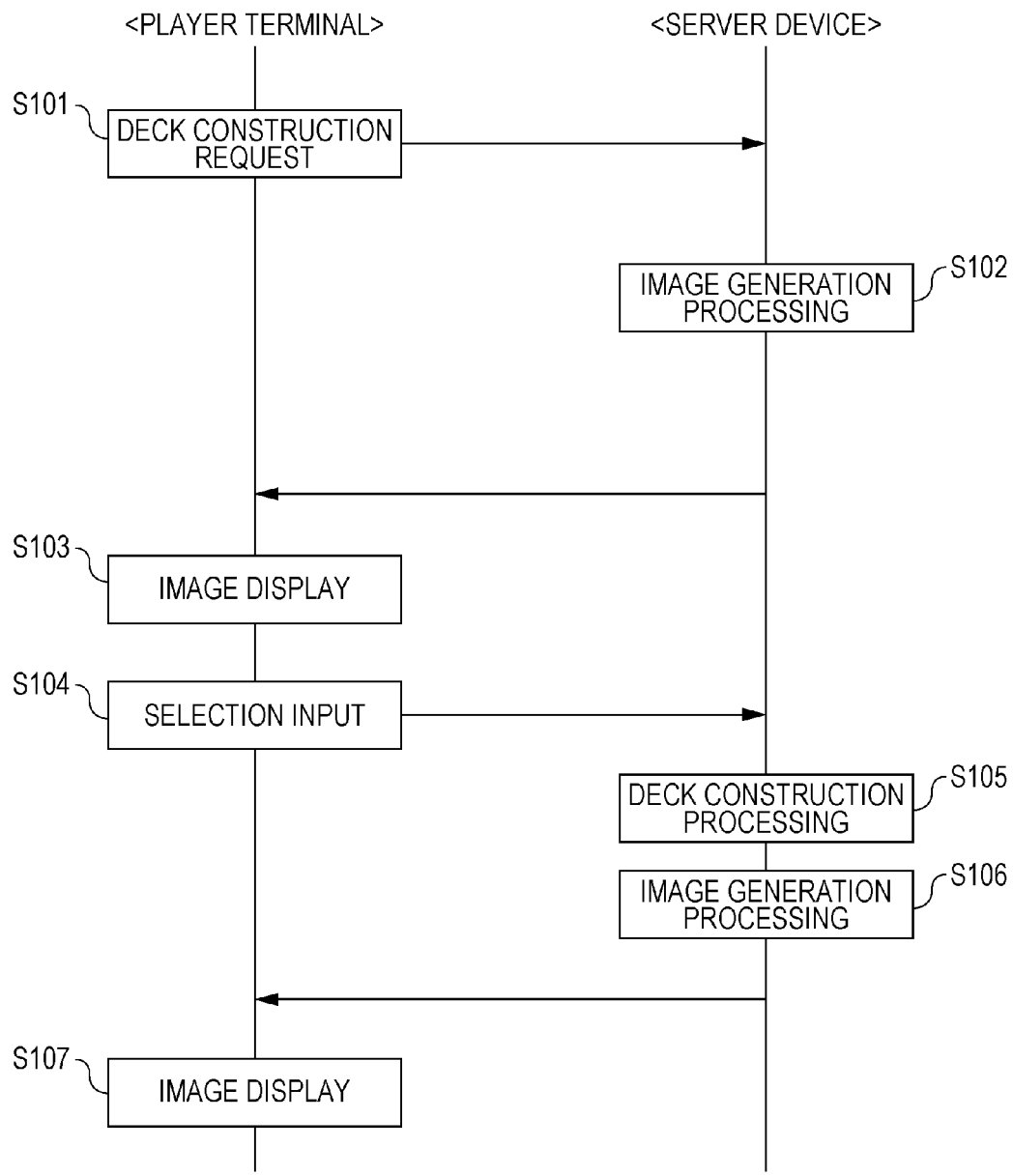
FIG. 9 is a flowchart for describing an exemplary operation related to a deck construction of the game system.

FIG. 9 is a flowchart describing an exemplary operation related to a deck construction in the game system 1.

First, in the player terminal 20, upon receiving an operation input of a deck construction start by the player from the terminal input unit 23, the terminal control unit 21 transmits a command for starting a deck construction (deck construction request) to the server device 10 through the terminal communication unit 25 (step S101).

Next, upon receiving the deck construction request transmitted from the player terminal 20, the server device 10 transmits a game image (image data) generated by the image generation unit 114 to the player terminal 20 that is a requestor through the communication unit 15 (step S102).

Next, the player terminal 20 causes the terminal display unit 24 to display a game screen based on the game image (image data) transmitted from the server device 10 (step S103).

Figure 10:
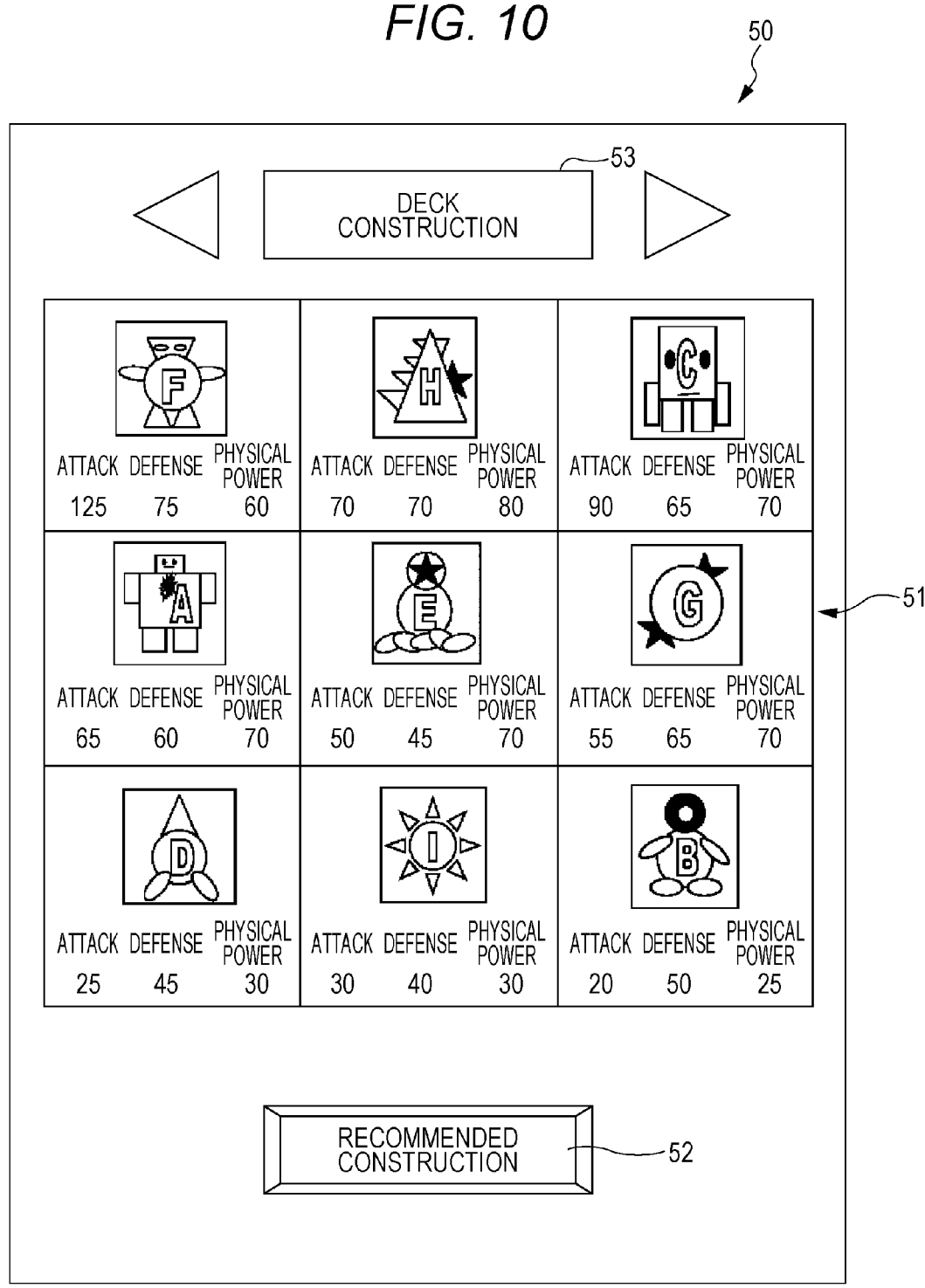
FIG. 10 is a diagram illustrating an exemplary game screen when a deck construction is performed.

FIG. 10 is a diagram illustrating an exemplary game screen for deck construction displayed in the terminal display unit 24. A game screen 50 is a game screen for allowing the player to perform an operation input related to a deck construction, and includes a character arrangement area 51, a recommended construction button 52, and a deck construction button 53. The character arrangement area 51 includes a total of nine (3×3) squares, and is an area in which characters that configure the deck are arranged corresponding to the squares. The player arranges a character selected from the plurality of characters possessed by the player in the squares to perform a deck construction operation. The recommended construction button 52 is an operation button for automatically constructing a deck. When a deck is automatically constructed, characters that configure the deck are arranged in the squares in the character arrangement area 51. The deck construction button 53 is an operation button for confirming the deck including the plurality of characters arranged in the character arrangement area 51.

Referring back to FIG. 9, when operation information related to the deck construction is selected and input by the player in this manner, the operation information is transmitted from the player terminal 20 to the server device 10 (step S104).

Next, the server device 10 performs deck construction processing based on the operation information transmitted from the player terminal 20 (step S105). To be specific, the character arrangement unit 111 of the server device 10 selects a character from among the characters (game cards) possessed by the player according to an operation by the player by referring to the possessed card information indicated by FIG. 6, and arranges the selected character in the character arrangement area 51 corresponding to a square selected according to an operation by the player. In addition, when the recommended construction button 52 is selected by the player on the game screen 50 illustrated in FIG. 10, the character arrangement unit 111 refers to the possessed card information illustrated in FIG. 6 and arranges a character selected from the characters (game cards) possessed by the player in the character arrangement area 51 corresponding to a square without an operation by the player. In this case, the character arrangement unit 111 selects characters having the attack power of higher parameter values from among the plurality of characters possessed by the player in sequence, and fills the characters in all of the squares in the character arrangement area 51 from the front squares one by one. When the deck construction is confirmed by arranging the plurality of characters in the character arrangement area 51 in this manner, deck information (see FIG. 7) corresponding to the constructed deck is recorded in the data storage unit 12.

Next, when the deck is constructed by the deck construction processing, the server device 10 transmits the game image (image data) generated by the image generation unit 114 to the player terminal 20 that is the requestor through the communication unit 15 (step S106).

Next, the player terminal 20 causes the terminal display unit 24 to display a game screen based on the game image (image data) transmitted from the server device 10 (step S107). The player can check the fact that the construction of the deck including the plurality of characters selected by the player and the construction of the deck including the plurality of characters automatically selected without an operation of the player are confirmed before start of a battle game by viewing the game screen displayed on the terminal display unit 24.

<Battle Operation>

Figure 11:
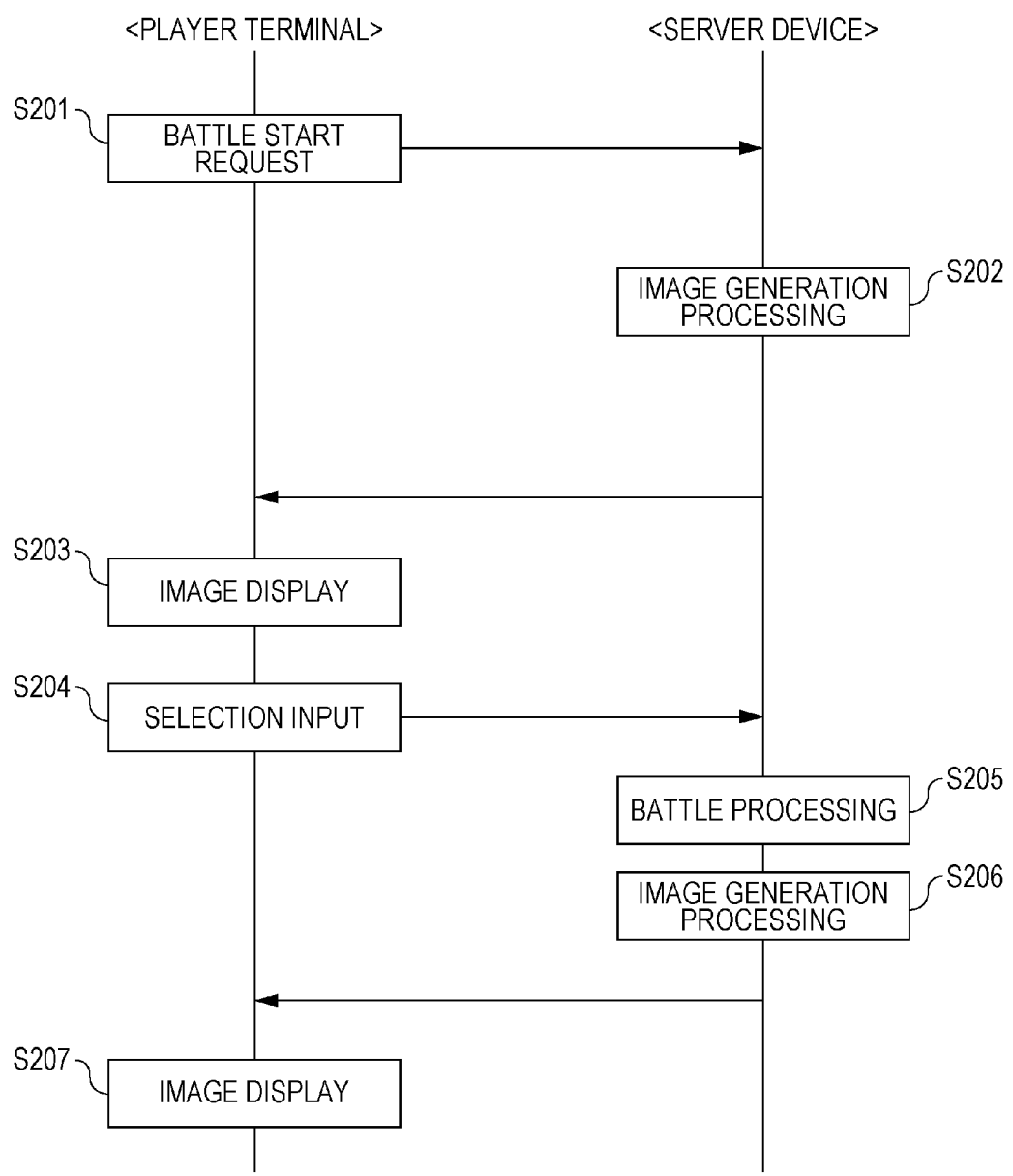
FIG. 11 is a flowchart for describing an exemplary operation related to a battle of the game system.

FIG. 11 is a flowchart describing an exemplary operation related to a battle in the game system 1.

First, in the player terminal 20, upon receiving an operation input of a battle start by the player from the terminal input unit 23, the terminal control unit 21 transmits a command for starting a battle game (battle start request) to the server device 10 through the terminal communication unit 25 (step S201).

Next, upon receiving the battle start request transmitted from the player terminal 20, the server device 10 transmits the game image (image data) generated by the image generation unit 114 to the player terminal 20 that is the requestor through the communication unit 15 (step S202).

Next, the player terminal 20 causes the terminal display unit 24 to display a game screen based on the game image (image data) transmitted from the server device 10 (step S203).

Figure 12:
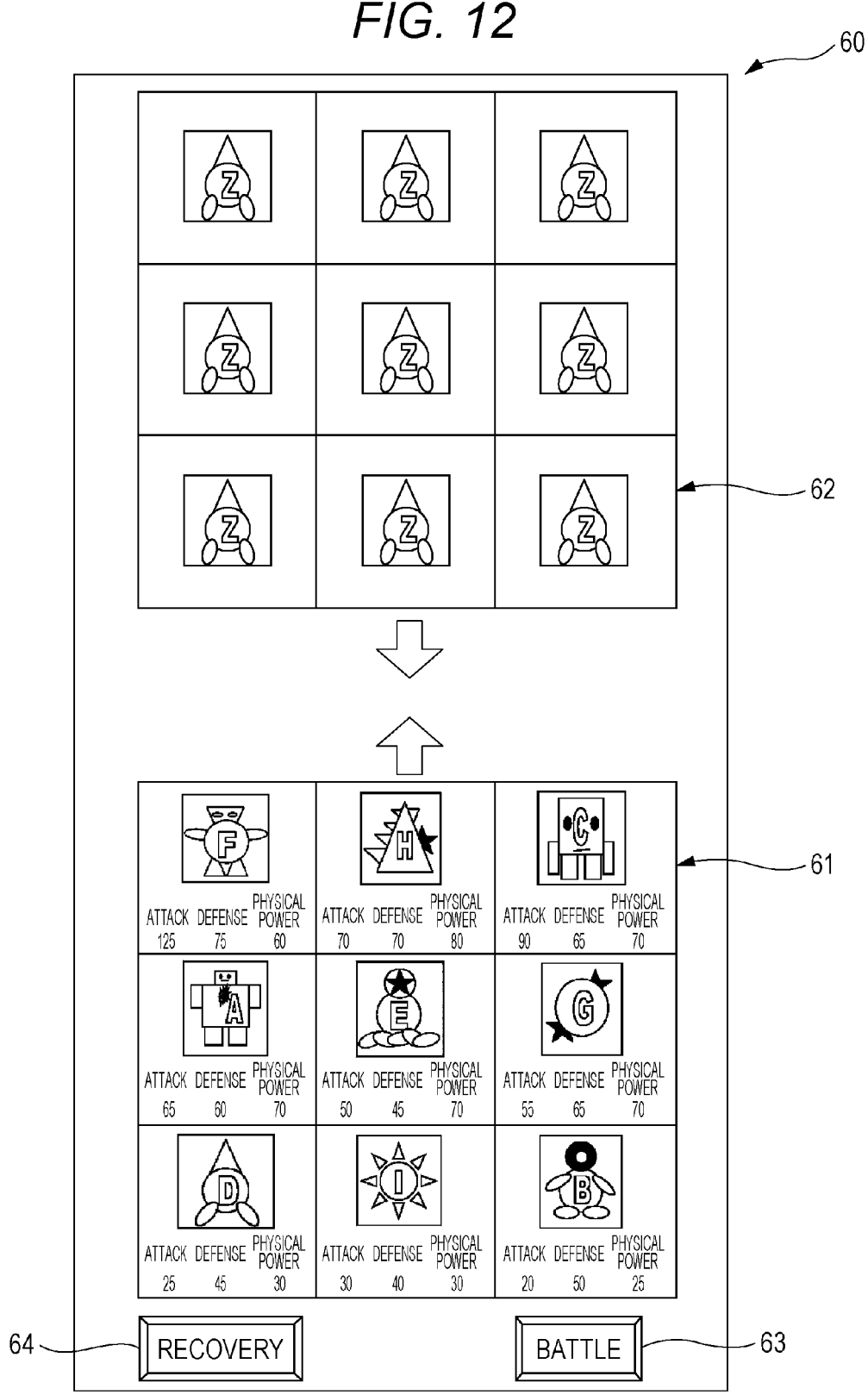
FIG. 12 is a diagram illustrating an exemplary game screen when a battle is performed.

FIG. 12 is a diagram illustrating an exemplary game screen for battle displayed in the terminal display unit 24. A game screen 60 is a game screen for allowing the player to perform an operation input related to the battle, and includes a character arrangement area 61, an enemy character arrangement area 62, a battle button 63, and a recovery button 64.

The character arrangement area 61 is an area in which player characters that configure the deck of the player are arranged corresponding to the total of nine (3×3) squares. The player characters in the squares are determined based on the deck information illustrated in FIG. 7. Parameter values indicating the attack power, the defense power, and the physical power of each player character are displayed corresponding to each square. Therefore, the player can perform arrangement change of the player characters by operating the terminal input unit 23 while viewing the various parameter values of the player characters during the battle. For example, by arranging a player characters arranged in a rear square in the character arrangement area 61 to a front square, the attack power of the player character can be raised based on the character arrangement area information illustrated in FIG. 8.

Note that, on the game screen illustrated in FIG. 12, display of the parameter values indicating the attack power, the defense power, and the physical power of the player characters on the squares may be omitted.

The enemy character arrangement area 62 is displayed facing the character arrangement area 61, and is an area in which enemy characters that are to be an opponent are arranged corresponding to a total of nine (3×3) squares. The enemy characters of the squares are selected from the plurality of characters (game cards) included in the card information illustrated in FIG. 4.

The battle button 63 is an operation button used for starting a battle between the player characters that configure the player's own deck and the enemy characters that configure an opponent deck. The recovery button 64 is an operation button used for recovering physical power parameters of the player characters that configure the player's own deck.

Referring back to FIG. 11, when the operation information related to the battle is selected and input by the player, the operation information is transmitted from the player terminal 20 to the server device 10 (step S204).

Here, when the battle button 63 is selected by the player on the game screen 60 illustrated in FIG. 12, the server device 10 receives the operation information for executing the battle, and determines battle details and a battle result by causing the battle processing unit 113 to execute battle processing (step S205). Note that, when an operation of character arrangement change is performed on the game screen 60 illustrated in FIG. 12, the character arrangement unit 111 performs rearrangement of the characters in the character arrangement area 61 according to an operation of the player. Further, when the recovery button 64 is selected on the game screen 60 illustrated in FIG. 12, the battle processing unit 113 performs processing of recovering the physical power parameters of the characters that configure the deck.

Figure 13:
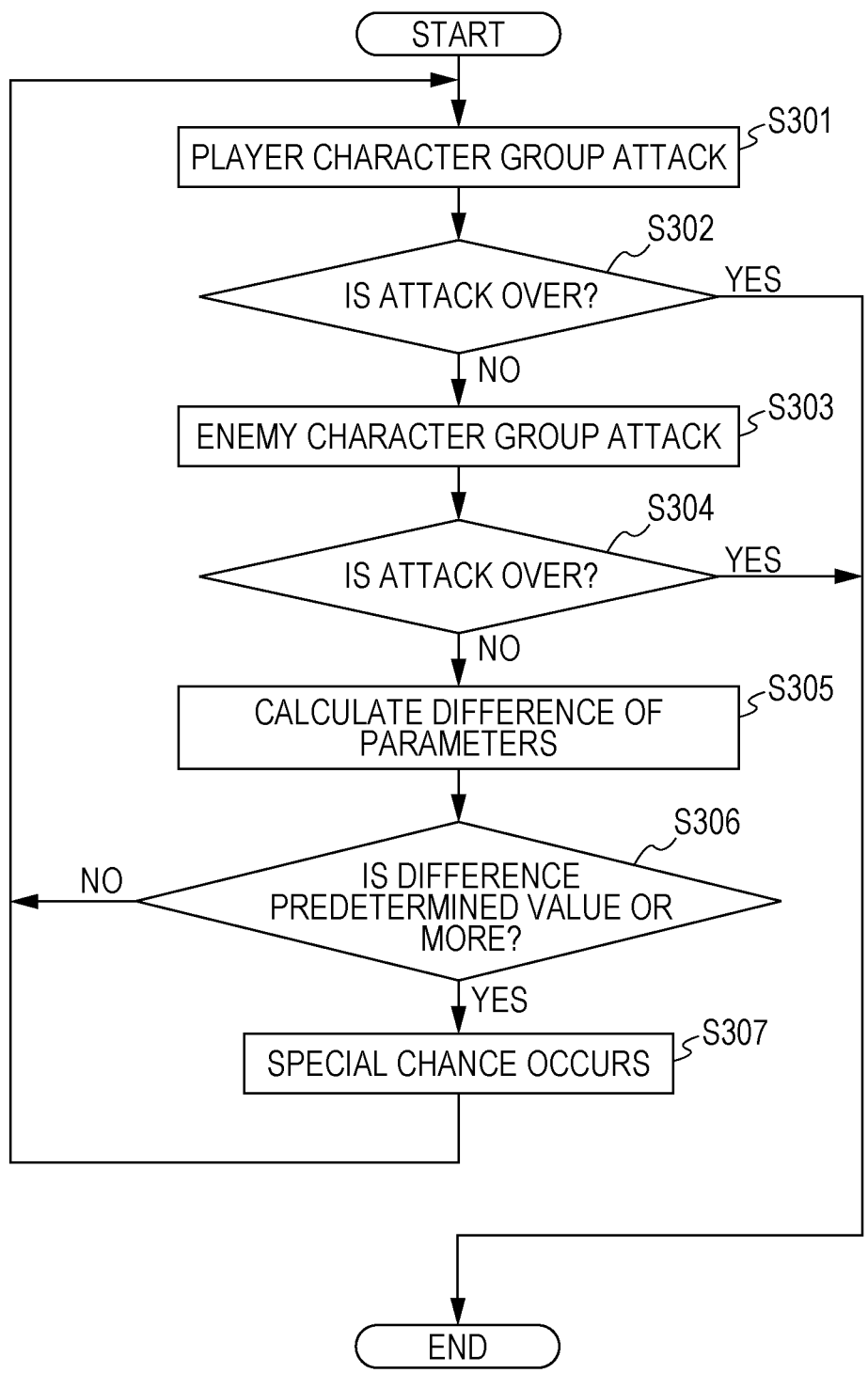
FIG. 13 is a flowchart for describing battle processing.

Here, the battle processing executed by the battle processing unit 113 will be specifically described. FIG. 13 is a flowchart for describing the battle processing.

First, the battle processing unit 113 starts an attack phase by the player characters that configure the player's deck, and perform attack processing in sequence until an attack operation of all of the player characters is completed (step S301). At this time, the battle processing unit 113 raises the attack power of the characters positioned in the front squares based on the character arrangement area information illustrated in FIG. 8, and decreases the attack power of the characters positioned in the rear squares based on the character arrangement area information illustrated in FIG. 8. The battle processing unit 113 then provides the enemy character group with damages in accordance with the attack power to decrease the physical power parameter values.

Next, the battle processing unit 113 determines whether an outcome has been determined by the attack operation of the player character group, that is, determines whether the enemy character group has been completely destroyed (step S302). That is, the battle processing unit 113 determines whether the physical power parameter values of all of the enemy characters have been zero. When having determined that the outcome has been determined (YES at step S302), the battle processing unit 113 terminates the battle processing. Meanwhile, when having determined that the outcome has not been determined (NO at step S302), the battle processing unit 113 terminates the attack phase of the player character group and moves on to an attack phase of the enemy character group.

Next, the battle processing unit 113 starts the attack phase by the enemy characters that configure the opponent's deck, and performs the attack processing in sequence until the attack operation of all of the enemy characters is completed (step S303). At this time, the battle processing unit 113 raises the defense power of the characters positioned in the rear squares based on the character arrangement area information illustrated in FIG. 8, and decreases the defense power of the characters positioned in the front squares based on the character arrangement area information illustrated in FIG. 8. The battle processing unit 113 calculates damage to the player character group caused by the attack of the enemy character group based on the defense power, and decreases the physical power parameter values.

Next, the battle processing unit 113 determines whether an outcome has been determined by the attack operation of the enemy character group, that is, determines whether the player character group has been completely destroyed (step S304). That is, the battle processing unit 113 determines whether the physical power parameter values of all of the player characters have been zero. When having determined that the outcome has been determined (YES at step S304), the battle processing unit 113 terminates the battle processing. Meanwhile, when having determined that the outcome has not been determined (NO at step S304), the battle processing unit 113 terminates the attack phase of the enemy character group.

Here, the battle processing unit 113 calculates a difference between the physical power parameter values of the player character group and the physical power parameter values of the enemy character group (step S305). That is, the battle processing unit 113 subtracts a total value of the physical power parameters of all of the player characters from a total value of the physical power parameters of all of the enemy characters.

The battle processing unit 113 then determines whether a difference value obtained in this manner is a predetermined value set in advance or more (step S306). When the difference value is not the predetermined value or more (NO at step S306), the battle processing unit 113 moves onto a next attack phase by the player character group. Meanwhile, when the difference value is the predetermined value or more (YES at step S306), the battle processing unit 113 causes a "special chance" that can provide the character arranged in the special area with a special effect in the next attack phase (step S307). This special chance is caused when the game state runs against the player (when the physical power of the player character group is substantially lower than the physical power of the enemy character group). Therefore, the situation can be reversed at once.

Figure 14:
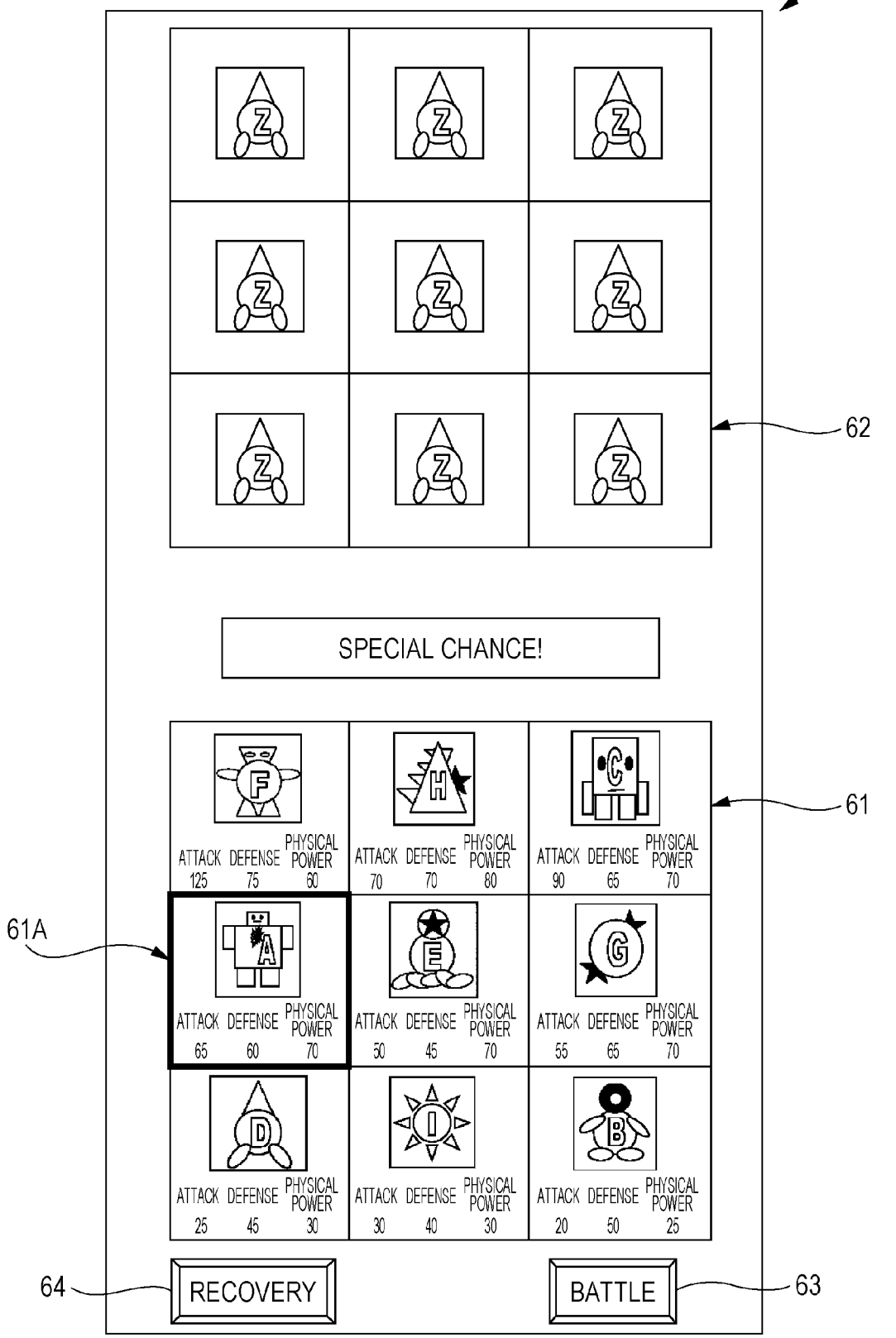
FIG. 14 is a diagram illustrating an exemplary game screen when a special area appears in a character arrangement area.
Figure 15:
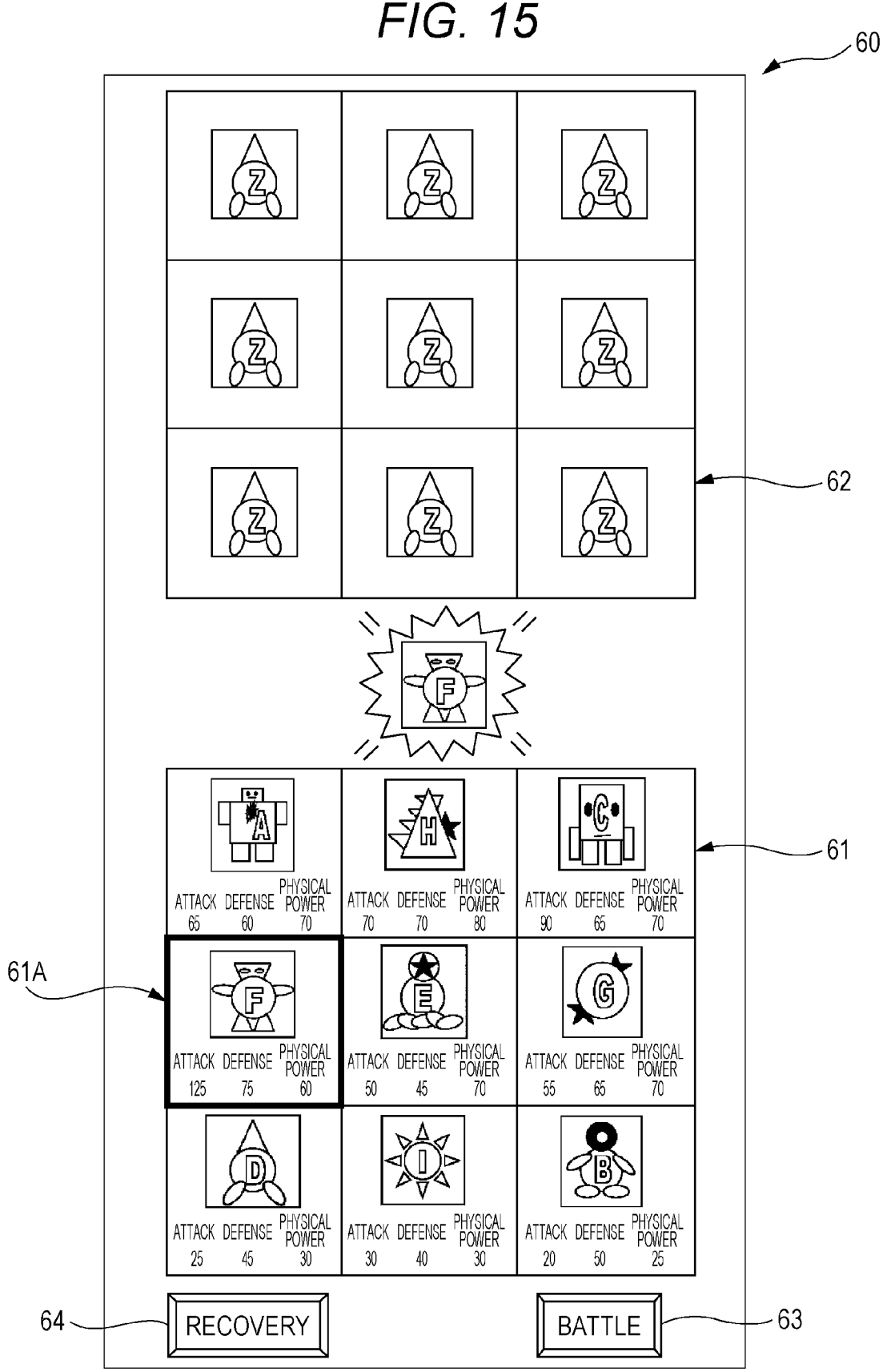
FIG. 15 is a diagram illustrating an exemplary game screen when a character is arranged in the special area.

FIG. 14 is a diagram illustrating an exemplary game screen when a special chance is caused. The game screen 60 is a game screen for causing the player to perform an operation input related to a battle, displays notification information that notifies the fact that the special chance is generated ("special chance!") on a center of the screen, and highlights a special area 61A appearing in the character arrangement area 61. This special area 61A is determined by the special area selection unit 112 of the server device 10 by randomly selecting an area from among the nine squares that configure the character arrangement area 61. The battle processing unit 113 controls attack processing in which the character arranged in the special area 61A performs an attack and attack processing in which a character arranged in an area other than the special area 61A to be different (causing the character in the special area 61A to exert a special effect). Therefore, the player performs an operation to arrange a character of own selection in the special area 61A when the special area 61A is highlighted on the game screen 60 due to occurrence of the special chance, so that the special effect can be generated for the character. For example, as illustrated in FIG. 15, when a "character F" is selected by an operation of the player on the game screen 60 of when the special chance is generated, the character arrangement unit 111 arranges the "character F" selected by the player in the special area 61A in place of a "character A" The battle processing unit 113 then executes attack processing of causing the "character F" in the special area 61A to exercise a special attack (special move), and executes attack processing of causing the "character A" in an area other than the special area 61A not to exercise the special attack (special move).

Note that, when the special chance is generated, the character arrangement unit 111 can automatically select and arrange a character to be arranged in the special area 61A without an operation of the player. In the present embodiment, the character arrangement unit 111 selects a player character having the highest attack power from among the nine player characters arranged in the character arrangement area 61 and arranges the player character in the special area 61A by referring to the possessed card information illustrated in FIG. 6 and the deck information illustrated in FIG. 7. By arranging the player character in this manner, larger damage can be given to the enemy character group by the attack of the player character in the special area 61A.

Figure 16:
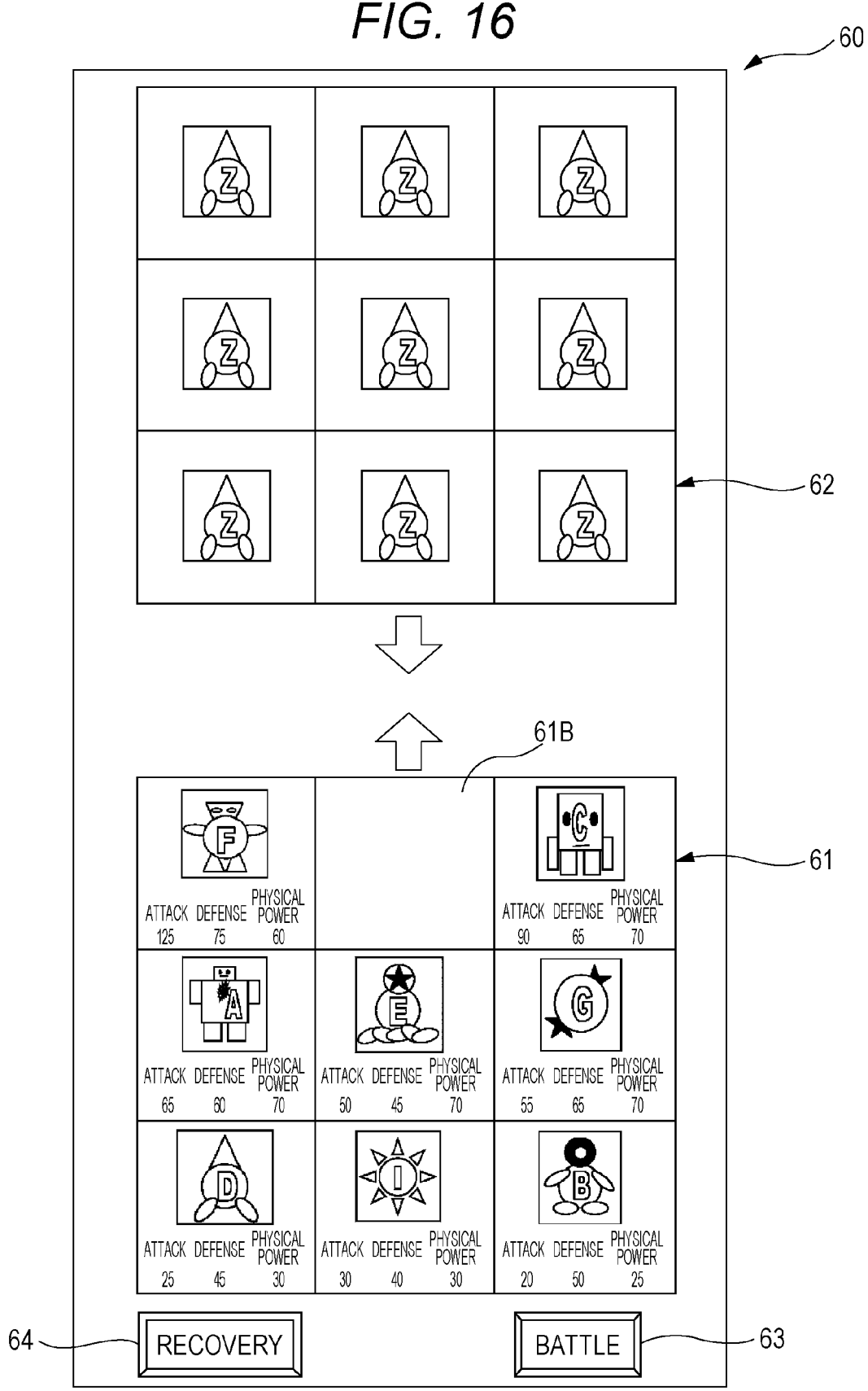
FIG. 16 is a diagram illustrating an exemplary game screen when a non-arrangement area appears in the character arrangement area.

In addition, the character arrangement unit 111 of the present embodiment can cause a character that satisfies a predetermined condition not to be arranged in a square when an attack from the enemy character group is given at step S303. For example, as illustrated in FIG. 16, the character arrangement unit 111 sets the square, in which the player character is being arranged, to a non-arrangement area 61B, in which no character is arranged, subject to the predetermined condition where the physical power parameter value of the player character becomes zero due to the attack of the enemy character group.

Figure 17:
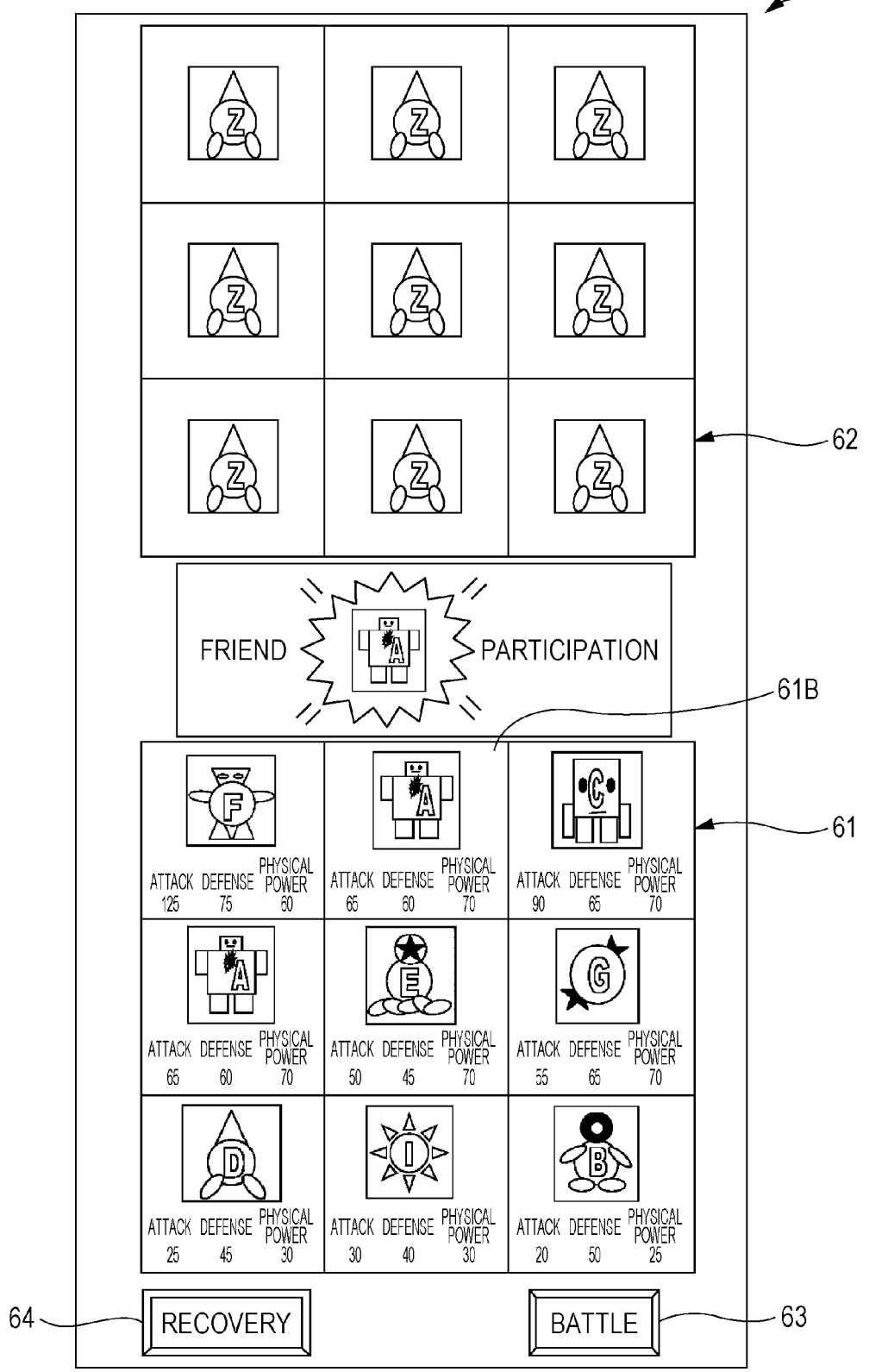
FIG. 17 is a diagram illustrating an exemplary game screen when a character is arranged in the non-arrangement area.

Then, the character arrangement unit 111 can arrange another character in the non-arrangement area 61B when causing the non-arrangement area 61B to appear in the character arrangement area 61. For example, as illustrated in FIG. 17, a character possessed by another player is arranged in the non-arrangement area 61B. That is, the character arrangement unit 111 arranges a character selected from the nine characters that configure the deck of a friend player (here, the "character A" of the friend player is selected) in the non-arrangement area 61B by referring to the player information illustrated in FIG. 5 and the deck information illustrated in FIG. 7.

Note that the character arrangement unit 111 may arrange a player character selected from the character arrangement area 61 by the player in the non-arrangement area 61B, or may arrange a character from the characters possessed by the player (for example, a character that is not being arranged in the character arrangement area 61) by referring to the possessed card information illustrated in FIG. 6.

Referring back to FIG. 11, when battle details and a battle result have been determined by the execution of the battle processing in this manner, the character arrangement unit 111 transmits the game image (image data) generated by the image generation unit 114 to the player terminal 20 that is a requestor through the communication unit 15 (step S206).

Next, the player terminal 20 causes the terminal display unit 24 to display a game screen based on the game image (image data) transmitted from the server device 10 (step S207). The player can check the battle details and the battle result by viewing the game screen displayed in the terminal display unit 24.

As described above, according to the game system 1 of the present embodiment, when the special chance is caused during a battle, any of a plurality of squares that configures the character arrangement area 61 is selected as the special area 61A and is highlighted. Then, the attack power of the character arranged in the special area 61A is controlled to be higher than the attack power of the character arranged in an area other than the special area 61A. An area that influences the attack power and the like of the character suddenly appears, or an appearance location of the area is changed in this manner. Therefore, the player does not get bored when the character arrangement is performed, and the uniformity of the character arrangement can be suppressed.

Other Embodiments

The above-described embodiments have been given for easy understanding of the present invention, and are not used to construe the present invention in a limited manner. The present invention can be changed and improved without departing from the gist of the invention and includes its equivalents thereof. Especially, embodiments described below are also included in the present invention.
<Character Arrangement Area>

In the above-described embodiments, the character arrangement area including a total of nine (3×3) squares has been exemplarily described. However, the present invention is not limited to this example. Also, the shape of a unit area that configures the card arrangement area is not limited to the square. In addition, topography information such as a mountain, a river, and a valley may be added to the unit area. Then, the parameter value of the character may be changed in accordance with the arranged topography.
<Selection of Special Area>

In the above-described embodiment, a case has been exemplarily described, in which the special area selection unit 112 selects an area randomly selected from a plurality of unit areas that configures the character arrangement area 61 as a special area. However, the present invention is not limited to the example. For example, in a case of the character arrangement area 61 including a total of nine (3×3) squares, a weight (probability) may be set so that the front squares are more likely to be selected. In such a case, the special area selection unit 112 selects the special area based on the probability.

Further, in the above-described embodiment, a case has been exemplarily described, in which the special area selection unit 112 selects an area selected from a plurality of unit areas that configures the character arrangement area 61 as a special area. However, the present invention is not limited to the example. For example, the special area selection unit 112 may select two or more areas as the special area. Further, for example, a first selection pattern in which one area is selected and a second selection pattern in which three areas are selected are prepared in advance, and the special area selection unit 112 may select the pattern in accordance with a game state. To be specific, the special area selection unit 112 is more likely to select the second selection pattern than the first selection pattern as the difference between the physical power parameter values of the player character group and of the enemy character group becomes larger.
<Selection of Character Arranged in Special Area>

In the above-described embodiment, it has been described that the character arrangement unit 111 can automatically arrange a character to be arranged in the special area 61A without an operation of the player when a special chance is generated. However, it is not limited to the arrangement in which a character player having the highest attack power is selected from the nine player characters arranged in the character arrangement area 61 and is arranged in the special area 61A. For example, a character having the highest level may be selected, or a character having the largest physical power parameter value may be selected.
<Attack Processing of Character Arranged in Special Area>

In the above-described present embodiment, a case has been exemplarily described, in which, when a special chance is generated, a character is caused to exercise a special attack (special move, and the like) as the attack processing in which the character arranged in the special area 61A performs an attack. However, the present invention is not limited to the example.

For example, an attack coverage area when a character is arranged in the special area 61A may be caused to be larger than an attack coverage area when a character is arranged in an area other than the special area 61A. To be specific, while a character arranged in an area other than the special area 61A can provide damage to only an enemy character positioned in one square, the character arranged in the special area 61A can provide damage to the enemy characters positioned in all of the squares.

Further, for example, the attack power of the character arranged in the special area 61A may be substantially increased. To be specific, the attack parameter value when a character is arranged in the special area 61A is substantially increased compared with the attack parameter value when the character is arranged in a front square.
<Occurrence of Special Chance>

In the above-described present embodiment, a case has been exemplarily described, in which the battle processing unit 113 checks an occurrence condition of the special chance in every turn, as illustrated in FIG. 13. However, the present invention is not limited to this example. For example, the battle processing unit 113 always checks the occurrence condition of the special chance during the attack phase of the player character group and the attack phase of the enemy character group, and when the occurrence condition is satisfied, the special chance may be generated in the middle of the turn (the special area may be caused to appear).
<Effect of Special Chance>

In the above-described present embodiment, a case has been exemplarily described, in which the character arranged in the special area 61A is caused to exercise the special attack (special move and the like) as the special effect of when a special chance is generated. However, the present invention is not limited to the example. For example, the physical power and the defense power of the character arranged in the special area 61A may be substantially increased. To be specific, the physical power parameter value when a character is arranged in special area 61A is substantially increased compared with the physical power parameter value when the character is arranged in an area other than the special area 61A. Further, the defense parameter value when a character is arranged in the special area 61A is substantially increased compared with the defense parameter value when the character is arranged in a rear square. Further, for example, when a player character is arranged in the special area 61A, the physical power parameter may be recovered to a maximum value.

<Character Arrangement in Non-Arrangement Area>

The character arrangement unit 111 in the above-described present embodiment may arrange a character selected according to an operation of the player, or may arrange a character automatically selected without the operation of the player when a character is supplementarily arranged in the non-arrangement area 61B that appears in the character arrangement area 61. Then, in the latter case, the character arrangement unit 111 may determine whether the character is arranged according to a predetermined probability. For example, the probability of arranging a character in the non-arrangement area 61B is set higher as the number of the non-arrangement areas 61B appearing in the character arrangement area 61 becomes larger. Accordingly, another character (for example, a character of the friend player) is more likely to be supplemented when the number of characters that configure the player character group is small.

<Server Device>

In the above-described present embodiments, the game system 1 provided with one server device 10 as an example of a server device has been described. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner.

<Information Processing Apparatus>

In the above-described game system 1 in the present embodiments, a case has been exemplarily described, in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing apparatus based on the game program.

Further, the player terminal 20 may perform a part of the functions as the information processing apparatus. In this case, the server device 10 and the player terminal 20 configure the information processing apparatus.

Note that the information processing apparatus is an example of a computer.

<Game Program>

In the game system 1 of the above-described embodiments, a case has been exemplarily described, in which the various types of processing are executed by the server device 10 and the player terminal 20 in cooperation with each other. The present invention includes a game program for executing such processing. That is, the server device 10 and the player terminal 20 as the information processing apparatuses may execute the above-described various types of processing based on the game program.

<Game Content>

In the game system 1 of the above-described present embodiments, game cards associated with characters has been described as an example of game content. However, the game content may be figures and the like.

What is claimed is:

1. A server device configured to be connected with a player terminal configured to display a game screen including a character arrangement area including a plurality of unit areas through a network, and to execute a battle game played by a player using a plurality of characters arranged corresponding to the unit areas in the character arrangement area, the server device configured to:
   store a player character group including the plurality of characters to be arranged in the character arrangement area;
   select a special area to be highlighted on a game screen displayed in the player terminal during the battle game from among the plurality of unit areas;
   arrange a character selected from the plurality of characters configuring the player character group in the special area according to an operation by the player; and
   during the battle game, calculate a difference value between a parameter value set to the player character group and a parameter value set to an enemy character value that is to be an opponent, and determine whether the calculated difference value is greater than or equal to a value, and
   configure a character arranged in the special area to receive a special chance during the battle game only when it is determined by the battle processing unit that the difference value is greater than or equal to the value, the special chance associated with an attack different from ones of the plurality of characters arranged in areas other than the special area, wherein attack processing of the character arranged in the special area causes the attack associated with the special chance to be invoked.

2. The server device according to claim 1, wherein
   the server device is configured to cause a unit area to be in a vacant state in which a character is not arranged by not arranging a character satisfying a condition in the unit area during the battle.

3. The server device according to claim 2, wherein
   the server device is configured to respectively store at least one character possessed by the player and at least one character possessed by another player, and
   to select a character possessed by the another player by referring to the storing, and arrange the selected character in the unit area in the vacant state.

4. A server device configured to be connected with a player terminal configured to display a game screen including a character arrangement area including a plurality of unit areas through a network, and to execute a battle game played by a player using a plurality of characters arranged corresponding to the unit areas in the character arrangement area, the server device configured to:
   store a player character group including the plurality of characters to be arranged in the character arrangement area;
   select a special area to be highlighted on a game screen displayed in the player terminal during the battle game from among the plurality of unit areas;
   arrange a character automatically selected from the plurality of characters configuring the player character group without an operation of the player in the special area; and
   during the battle game, calculate a difference value between a parameter value set to the player character group and a parameter value set to an enemy character value that is to be an opponent, and determine whether the calculated difference value greater than or equal to a value, and
   configure a character arranged in the special area to receive a special chance during the battle game only when it is determined by the battle processing unit that the difference value is greater than or equal to the value, the special chance associated with an attack different from ones of the plurality of characters arranged in areas other than the special area, wherein attack processing of the character arranged in the species area causes the attack associated with the special chance to be invoked.

5. The server device according to claim 4, wherein
the server device is configured to cause a unit area to be in a vacant state in which a character is not arranged by not arranging a character satisfying a condition in the unit area during the battle.

6. The server device according to claim 5, wherein
the server device is configured to respectively store at least one character possessed by the player and at least one character possessed by another player, and
to select a character possessed by the another player by referring to the storing, and arrange the selected character in the unit area in the vacant state.

7. A non-transitory computer-readable storage medium storing a game program for causing a server device configured to be connected with a player terminal configured to display a game screen including a character arrangement area including a plurality of unit areas through a network to execute a battle game played by a player using a plurality of characters arranged corresponding to the unit areas in the character arrangement area, the game program for causing the server device to execute:

processing of storing a player character group including the plurality of characters to be arranged in the character arrangement area in a storage unit;

processing of selecting a special area to be highlighted on a game screen displayed in the player terminal during the battle game from among the plurality of unit areas;

processing of arranging a character selected from the plurality of characters configuring the player character group in the special area according to an operation of the player; and wherein, during the battle game, processing of calculating a difference value between a parameter value set to the player character group and a parameter value set to an enemy character value that is to be an opponent and determining whether the calculated difference value is greater than or equal to a value, and configuring a character arranged in the special area to receive a special chance during the battle game only when it is determined in the battle processing that the difference value is greater than or equal to the value, the special chance associated with an attack different from ones of the plurality of characters arranged in areas other than the special area, wherein attack processing of the character arranged in the special area causes the attack associated with the special chance to be invoked.

8. A non-transitory computer-readable storage medium storing a game program for causing a server device configured to be connected with a player terminal configured to display a game screen including a character arrangement area including a plurality of unit areas through a network to execute a battle game played by a player using a plurality of characters arranged corresponding to the unit areas in the character arrangement area, the game program for causing the server device to execute:

processing of storing a player character group including the plurality of characters to be arranged in the character arrangement area in a storage unit;

processing of selecting a special area to be highlighted on a game screen displayed in the player terminal during a battle from among the plurality of unit areas;

processing of arranging a character automatically selected from the plurality of characters configuring the player character group without an operation of the player in the special area; and wherein, during the battle game, processing of calculating a difference value between a parameter value set to the player character group and a parameter value set to an enemy character value that is to be an opponent and determining whether the calculated difference value is greater than or equal to a value and configuring a character arranged in the special area to receive a special chance during the battle game only when it is determined in the battle processing that the difference value is greater than or equal to the value, the special chance associated with an attack different from ones of the plurality of characters arranged in areas other than the special area, wherein attack processing of the character arranged in the special area causes the attack associated with the special chance to be invoked.

* * * * *